April 7, 1931.  F. W. SPERR, JR  1,799,444
METHOD AND APPARATUS FOR TREATMENT OF WASTES
Filed March 29, 1926  3 Sheets-Sheet 1
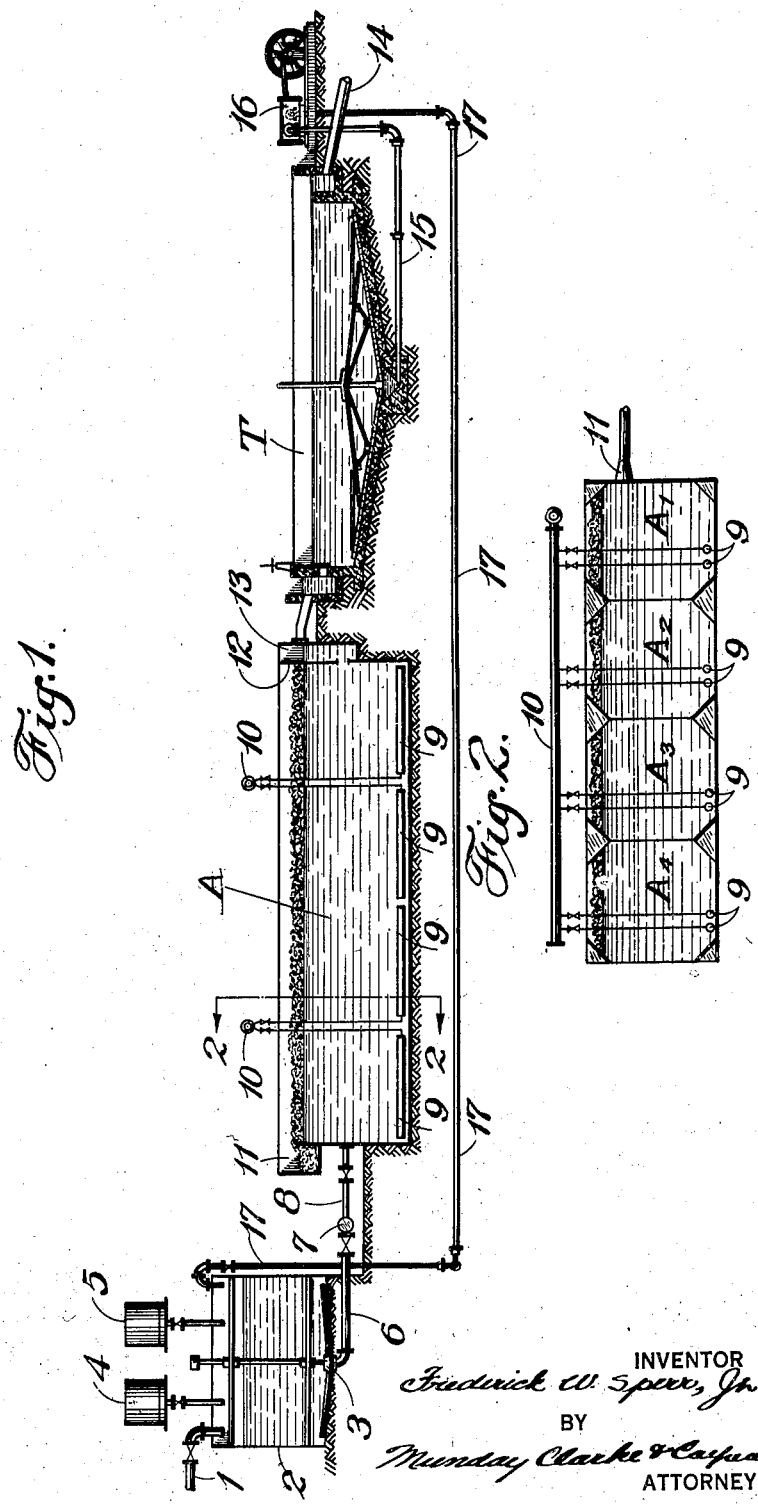

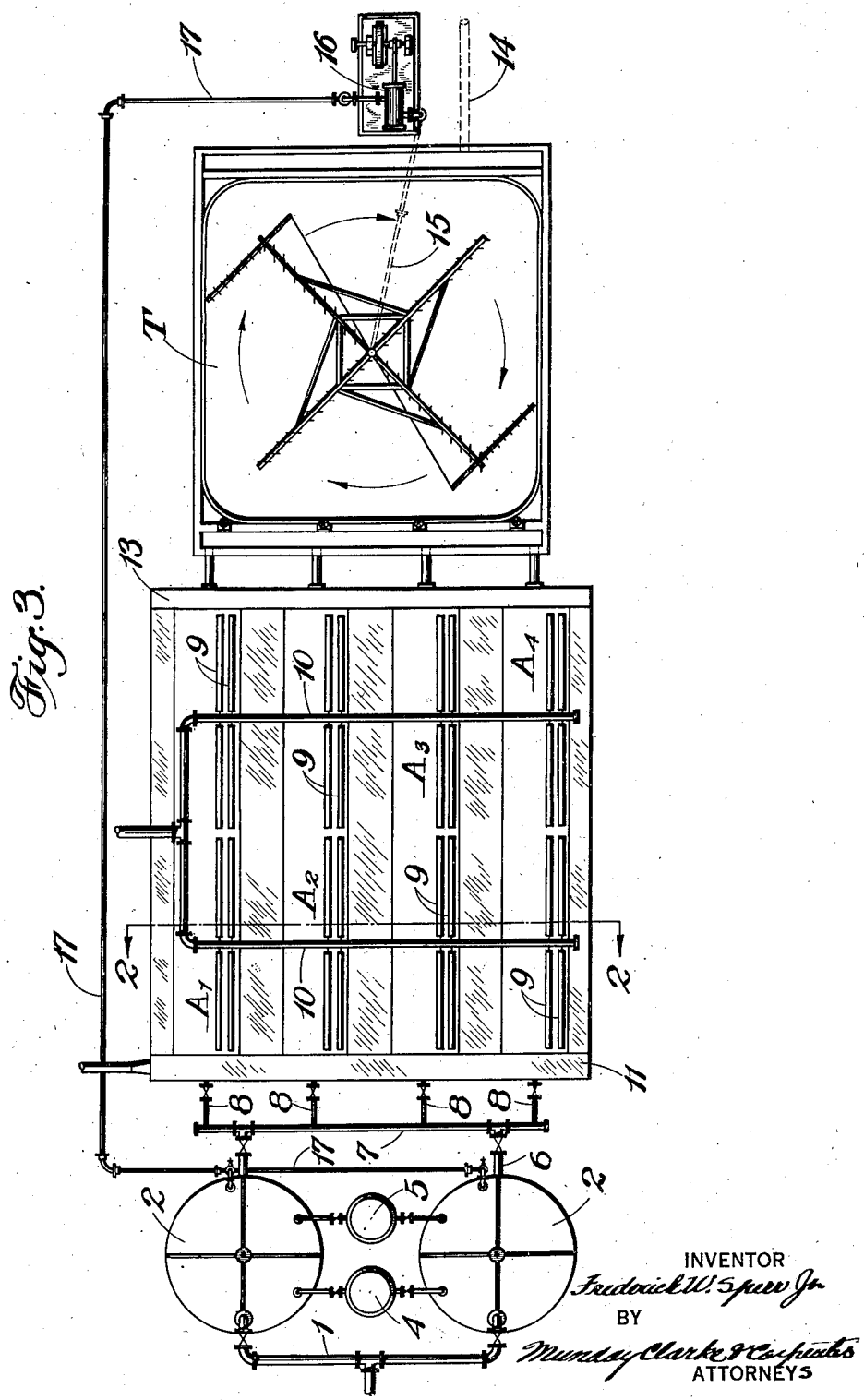

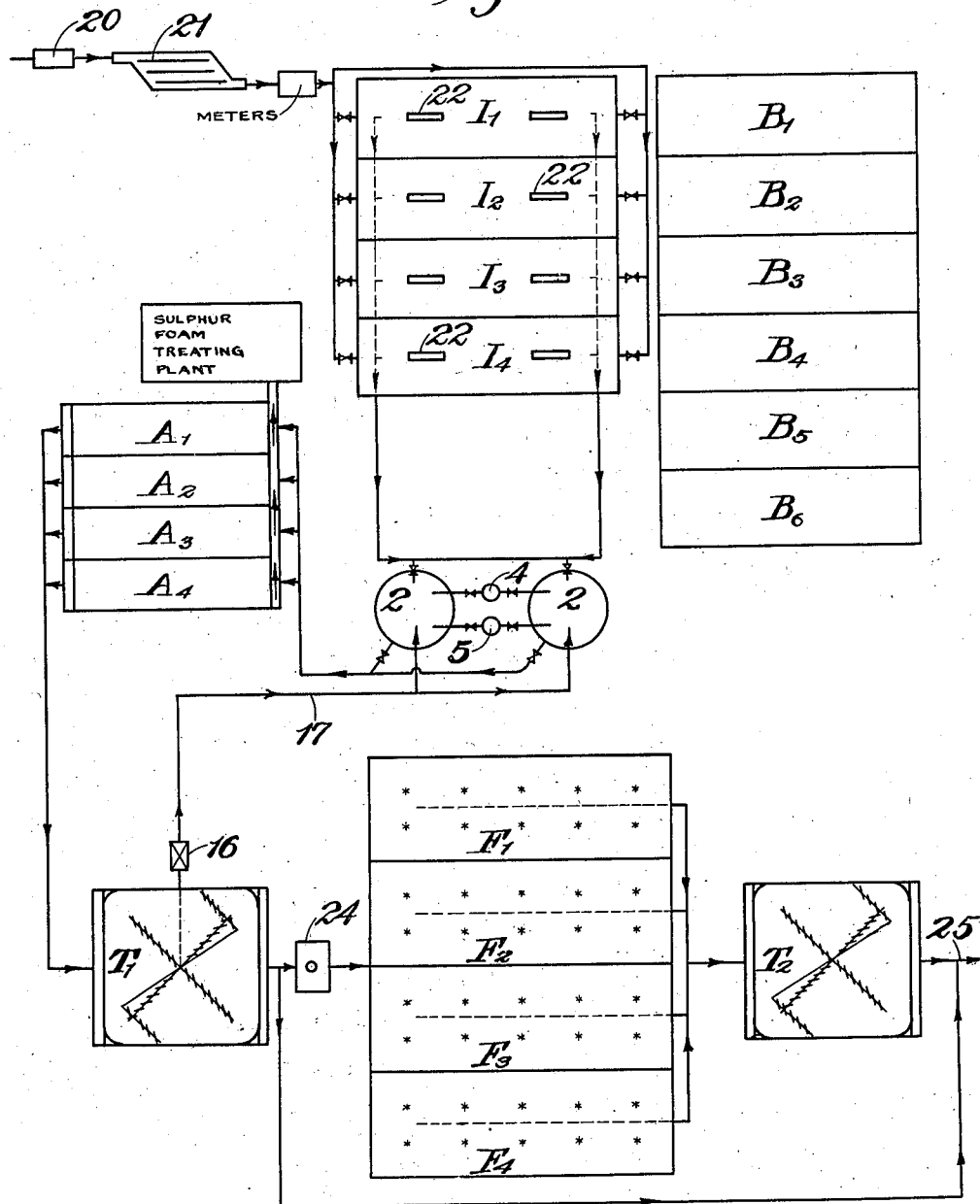

Patented Apr. 7, 1931

1,799,444

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

METHOD AND APPARATUS FOR TREATMENT OF WASTES

Application filed March 29, 1926. Serial No. 98,372.

This invention relates to the treatment of wastes, such as sanitary, municipal, and/or industrial sewage, and more particularly the effluent from such wastes as have been subject to treatment in septic or Imhoff tanks, especially when such wastes and/or effluents contain hydrogen sulphide and analogous volatile constituents of noxious character. A main object of the present invention is to produce an odorless effluent and to prevent the escape of hydrogen sulphide or the like into the atmosphere during the period of detention.

The invention further consists in such other new and useful improvements, and has for further objects such other operative advantages or results, as may be found to obtain in the process or apparatus hereinafter described or claimed.

In the operation of certain sewage disposal plants, the liberation of hydrogen sulphide has become a source of annoyance, even making it impossible to treat the sewage in open tanks or sprinkling filters, because of the fact that the hydrogen sulphide escaping into the atmosphere causes a stench.

The present invention provides means to prevent such noxious gas in the air leaving or adjacent to the treatment tank. Such means comprise maintaining in the liquid being treated in the treatment tank a substance, preferably a compound of a metal which forms an insoluble sulphide, and which reacts chemically with, or facilitates chemical reaction of, the fouling constituents to form inert residues, and in maintaining upon the surface of the liquid in the treatment tank a blanket of foam of such character as will rapidly absorb hydrogen sulphide or the like. Such a foam is analogous to the foam produced in such gas purification processes as are described and claimed in copending applications Ser. No. 730,676, filed Aug. 7, 1924; Ser. No. 614,582, filed January 24, 1923; and Ser. No. 21,979, filed April 9, 1925, but the very special conditions make necessary novel method of procedure and apparatus, as will be recited hereinbelow.

According to my invention, I add to the liquid being treated a small amount of a compound of some substance the sulphide of which is insoluble, for example, hydrated iron oxide, with or without the addition of an alkali, such as lime, and I aerate the said liquid in such a manner as to agitate the liquid and maintain the said compound distributed throughout it and to effect oxidizing reactions therein and to produce a foam upon the surface thereof. The liquid is subjected to sedimentation in suitable apparatus, and the settled sludge is returned to the aeration tank, somewhat after the manner of the activated sludge process of sewage treatment.

In practising my invention, I prefer to add to the sewage sufficiently freshly precipitated ferric hydrate to produce a concentration of from 0.01 to 0.10 per cent of $Fe_2O_3$ in the said liquid. However, larger amounts of iron are not only unobjectionable, but may also facilitate the oxidation of organic material present in the sewage. The ferric hydrate may be prepared from finely pulverized bog iron ore. In my cycle of operation, most of the iron is contributed by the sludge from the sedimentation stage, but additional quantities may be added to make up for mechanical losses, etc. Instead of the employment of a reactive iron compound there may be employed reactive compounds of nickel, cobalt, chromium or manganese or mixtures thereof, in such proportions as to react with the fouling constituents in the liquid being treated. Or instead of employing compounds so reacting there may be employed various catalysts, such as nickel sulphide or other nickel compounds, present in only the very small amount necessary to act catalytically in inducing or facilitating oxidation or other reaction that eliminates the fouling constituents in the liquid.

In order to facilitate the reaction between the hydrogen sulphide and the iron compound, or to further the effective action of a catalyst, I may add an alkali to the liquid being treated. Ordinarily, I prefer to use lime on account of its cheapness and availability, but I may use other alkalies, as for example sodium carbonate. The alkali may be added to substantially neutral liquids to produce a concentration equal to that of the iron compound, but additional quantities may be used when the sewage is more strongly acid in character, or when greater alkalinity proves desirable.

I prefer to maintain a blanket of foam from three to six inches in depth upon the surface of the liquid in the aeration tank, but a greater depth of foam can be employed. It should be noted that the said foam not only absorbs hydrogen sulphide, but also has a purifying effect upon any other odors rising from the said liquid in the course of aeration.

The action of the iron compound is such as to absorb any hydrogen sulphide that may be present in the sewage, forming ferric sulphide, which is immediately and very actively oxidized by the action of the air used for aeration. In this oxidation free sulphur is liberated, which floats as a foam through the action of the air bubbles. This foam also carries some of the iron compound, which is adapted to absorb any hydrogen sulphide which may have escaped absorption in the body of the liquid. The reaction of the compounds of other metals may be similar to that of the iron compound. Or instead of employing metallic compounds so reactive with the hydrogen sulphide there may be employed, as before mentioned, substances or compounds that are catalytic in nature or effect, such for instance as nickel sulphide, and that therefore require to be used in only much smaller quantities than the reactive compounds such as iron compounds.

For aeration of the sewage, I prefer an aeration tank, employing porous diffusion means such as the aerators described and claimed in the copending application of Seil, Ser. No. 21,978, filed April 9, 1925, filtros or earthenware blocks, or the like, and such means may be so arranged as to impart a rolling motion to the sewage as in the well known Manchester tank. However, I may employ other types of aeration tank, or mechanical aerator, but preferably such means are adapted to be operated with a blanket of foam upon the surface of the liquid therein.

In some cases, the amount of sulphur present may be insufficient to produce a satisfactory foam, although organic substances present in the sewage and/or sludge will facilitate foaming. I may in such instances add materials that will increase the foaming tendency, as for example, pine oil, kerosene, or such substances as saponin, well known in the flotation art. In general, I prefer to avoid the use of phenolic materials, such as cresyllic acid, as these are known to exert a deleterious effect upon the sewage.

My invention may be applied to sewage directly, or to the effluent from septic or Imhoff tanks or other means for treating sewage. For the purpose of exemplification, applications of the invention to sewage and to the Imhoff effluent have been set forth in the accompanying drawings, and will presently be described, without limiting the claimed invention to such illustrative instances.

In the said drawings,

Fig. 1 is an elevational view of preferred apparatus for treating sewage directly after the manner of the present invention;

Fig. 2 is a sectional view taken on the line 2—2 of Fig. 1;

Fig. 3 is a plan view of the apparatus shown in Fig. 1; and

Fig. 4 is a more or less diagrammatic representation of a sewage disposal plant, wherein the present invention is applied to the effluent from the Imhoff tanks.

The same characters of reference designate the same parts in each of the several views of the drawings.

Referring to the drawings, and more particularly to Figs. 1, 2 and 3, it is assumed that the sewage to be treated enters through the inflow sewer 1. The said sewage has preferably been passed through grit chambers, screens and the like, for the removal of mineral matter, entrained rubbish, fecal-matter, the carcasses of small animals, etc., and may or may not have been subjected to a preliminary sedimentation and/or concentration.

Although the iron compound and alkali may be added directly to the aeration chambers, it is generally preferable to add these in separate apparatus. In the present instance, the sewage is admitted to one of the tanks 2 provided with agitators 3, and the iron compound and alkali (the latter in the form of milk of lime) are admitted to the said tanks 2 from the tanks 4 and 5, respectively. The sewage is well mixed with the added substances before it passes out of the tanks 2 through the conduit 6. (The tanks 2 are preferably arranged for alternate use.) It enters the header 7, and is distributed to the compartments $A_1$, $A_2$, $A_3$, and $A_4$ of the aeration tank A through the lines 8.

In the present instance, the aeration tank A is of the well-known Manchester type, and is comprised of the four compartments already referred to. Within each of the said compartments is a plurality of aerators 9 (the tubular aerators of the aforesaid Seil copending application) arranged along the entire length of the tank A, and in the lower corners of the several compartments $A_1$, $A_2$, $A_3$, and $A_4$. The said aerators 9 are connected by suitable piping to the air supply headers 10. The aeration keeps the sewage in a state of agitation and maintains the distribution of the iron compound throughout it and effects oxidation of the iron compound that becomes sulphided in reaction with the hydrogen sulphide in the liquid, liberating as free sulphur the sulphur from the iron sulphide so oxidized; and by reason also of the aeration, assisted by the presence of sulphur, organic matter, foaming agents, etc., a considerable amount of foam is produced which floats upon the surface of the liquid being aerated and may be drawn off when in excess, through the foam channel or launder 11, to be dried, filtered, or otherwise disposed of. The iron compound and alkali present in the foam cause any residual hydrogen sulphide and other noxious volatile impurities to be absorbed in the said foam, thus preventing their escape into the atmosphere. The foam may be prevented from overflowing with the aerated sewage by the baffle 12, while the said sewage passes into the sealed trough 13, and thence into the Dorr thickener T for sedimentation. The operation of this thickener is well known and will not require detailed description. The clarified effluent passes off through the outfall sewer 14, and may now be passed through a sprinkling filter, if necessary, without fear of liberating hydrogen sulphide into the air, or it may in some instances be drained directly into the adjacent river or the like.

The sludge, containing most of the iron compound, passes out of the thickener T through the pipe 15, and is forced by the pump 16 through line 17 into the tanks 2, for the treatment of further sewage. Portions of this sludge may be discarded from time to time, as the amount of sludge accumulates.

The application of the present invention to a system employing Imhoff tanks for the treatment of the sewage is shown in Fig. 4. The sewage upon entering the plant passes through the screens 20 for the removal of large entrained matter, and the grit chamber 21, where the velocity is so adjusted as to permit the precipitation of substantially all of the mineral material, without loss of organic material. If the amount of hydrogen sulphide contained in the sewage is large, it may be advisable to cover the screen and grit chambers. The sewage then is metered, and passes into the plurality of Imhoff tanks $I_1$, $I_2$, $I_3$, and $I_4$. The operation of these tanks is so well known in the art that a detailed description is unnecessary; the sewage is clarified by sedimentation, the sludge passing into the lower portions of the tanks for fermentation and liquidation. The sludge is removed from the bottoms of the Imhoff tanks, and spread out upon the sludge drying beds, $B_1$, $B_2$, etc., and subsequently removed and used for fertilizer or other purposes. A considerable amount of gas, consisting largely of methane, escapes from the Imhoff tanks, and may be drawn off through the vents 22. In many cases, this gas may be used for illuminating gas in the plant. If the amount of $H_2S$ contained by the said gas is large, it may be purified by any suitable means. The piping to the Imhoff tanks, which in this instance are rectangular, preferably is arranged so as to permit reversal of flow as desired.

The partially clarified sewage is then run into one of the mixing tanks 2, and mixed with sludge from the thickener T, and additional quantities of ferric hydrate and lime as necessary. The sewage after dosing then passes into the plurality of aeration tanks $A_1$, $A_2$, $A_3$, and $A_4$, which are constituted as hereinabove described. After thorough aeration in these tanks, under the protection of a blanket of foam, the sewage passes into the Dorr thickener $T_1$, or other sedimentation device, where the sludge is settled out, and returned to the mixing tanks 2. The effluent may then be run directly into the outfall sewer through the conduit 23, or may be sent to the flush tank 24, and distributed to the sprinkling filters $F_1$, $F_2$, $F_3$ and $F_4$, and/or the thickener $T_2$ for final clarification. The effluent then passes out of the plant through the outfall sewer 25. My process is not limited to the particular apparatus shown for sedimentation purposes, such as Imhoff tanks and Dorr thickeners, as other apparatus suitable for the purpose may be used.

As stated in the first paragraph of this specification, it will be understood that in the following claims the treated sewage referred to may be sanitary, municipal and/or industrial sewage or wastes.

Although my invention has been herein set forth and described with reference to particular illustrative embodiments and applications, it may be variously embodied within the scope of the following claims.

I claim:

1. In a sewage treatment process: aerating the sewage in the presence of a compound of a metal whose sulphide is insoluble, with the maintenance of a foam upon the surface of the liquid during said aeration.

2. In a sewage treatment process as claimed in claim 1, the effecting of such aeration and foaming and then effecting sedimentation of the treated sewage and returning the resultant sludge, containing the regenerated compound, to further sewage to be so aerated.

3. In a sewage treatment process: aerating the sewage in the presence of a compound of a metal whose sulphide is insoluble, then effecting sedimentation of the treated effluent and returning the resultant sludge, containing the regenerated compound, to further sewage to be so aerated.

4. In a sewage treatment process: aerating the sewage in the presence of an alkali and of a compound of a metal whose sulphide is insoluble, with the maintenance of a foam upon the surface of the liquid during said aeration.

5. A sewage treatment process as claimed in claim 1 and in which the compound employed is ferric hydrate.

6. A sewage treatment process as claimed in claim 4 and in which the alkali employed is lime.

7. In a sewage treatment process: aerating the sewage in the presence of an iron compound, with the maintenance of foam upon the surface of the liquid during said aeration.

8. In a sewage treatment process: aerating the sewage in the presence of lime and of ferric hydrate, and then effecting sedimentation of the treated effluent and returning the iron-bearing sludge to further sewage to be so treated.

9. In a sewage treatment process: aerating the sewage in the presence of an iron-bearing sludge and under the protection of foam formed on the so aerated sewage during its aeration.

10. In a sewage treatment process: aerating the sewage in the presence of a compound of a metal whose sulphide is insoluble and of a flotation agent, with the resultant maintenance of a foam upon the surface of the liquid during said aeration.

11. In a sewage treatment process as claimed in claim 10 and in which the flotation agent employed is one such as pine oil.

12. In a sewage treatment process: commingling the sewage with a compound of a metal whose sulphide is insoluble reacting chemically with the fouling constituents to form inert residues that may be removed as they accumulate; effecting separation of the thus treated liquid and recirculating the separated reactive compound to commingle with further sewage to be so treated; and, to compensate losses or withdrawals, maintaining a supply of additional reactive compound.

13. A sewage treatment process as claimed in claim 12 and in which the reactive compound employed is ferric hydrate.

14. In a sewage treatment process: commingling iron oxide and alkali with sewage, aerating such mixture with finely comminuted air and liberating free sulphur from the sulphided iron and producing a foam on the surface of the treated sewage; passing the so treated sewage to a sedimentation stage; withdrawing resultant sludge from such sedimentation stage and returning it to further sewage to be so treated, with addition of further iron oxide and alkali to compensate losses.

15. In a sewage treatment process: commingling sewage and a compound of a metal whose sulphide is insoluble; aerating such mixture to oxidize metallic sulphide for liberating free sulphur therefrom and effecting flotation of such free sulphur in the resultant foam on the treated sewage; separating sludge from the so aerated sewage, and returning such sludge to commingle with further sewage and with additional metal compound freshly supplied thereto.

16. In a sewage treatment process: mixing sewage with a compound of a metal whose sulphide is insoluble; aerating such mixture; separating sludge from the aerated mixture; and returning the sludge to the mixing stage.

17. In a sewage treatment process: effecting sedimentation of the sewage and fermentation of the resultant sludge, and withdrawing the effluent; aerating such effluent in the presence of ferric hydrate and a foam blanket; withdrawing the so treated effluent and effecting sedimentation to recover the iron-bearing sludge, and returning the said sludge to the aeration treatment stage; and effecting final clarification of the effluent from the last mentioned sedimentation stage.

18. Apparatus for treating sewage comprising, in combination: a primary treatment tank adapted to digest the raw sewage and separate sedimentary sludge therefrom; a mixing tank for mixing the effluent, from the primary tank, with chemical purifying compounds; means for leading the effluent sewage from the primary tank to said mixing tank; an aeration tank having means therein for diffusing finely comminuted air in said effluent in said aeration tank; means for leading the mixture from said mixing tank to said aeration tank; a secondary sedimentation tank; means for leading aerated sewage from said aeration tank to said secondary sedimentation tank; means for returning the sludge of said secondary sedimentation tank to said mixing tank; and means for clarifying the effluent from said secondary tank.

19. Apparatus for treating sewage comprising, in combination: a primary treatment tank adapted to digest the raw sewage and separate sedimentary sludge therefrom; a mixing tank for commingling the effluent, from the primary tank with chemical purifying compounds; means for leading the effluent sewage from the primary tank to said mixing tank; an aeration tank having means therein for aerating the mixture of said mixing tank in said aeration tank; means for leading the mixture from said mixing tank to said aeration tank; a secondary sedimentation tank; means for leading the aerated sewage from the aeration tank to said secondary sedimentation tank; and means for leading sludge from the secondary sedimentation tank back to said mixing tank.

20. Sewage aeration means comprising, in combination: a tank for holding sewage and chemical purifying compounds; porous aerating members in said tank adapted to diffuse finely comminuted air in the liquid in said tank; means for supplying air to said members; a foam trough for collecting the overflow surface foam resulting from said fine comminution of air; means for the withdrawal of aerated sewage; and means for returning to said aeration tank chemical purifying compounds recovered from the aerated sludge.

21. In a process of aerating sewage, that step which comprises maintaining upon the surface of the sewage a foam of such character as to be capable of absorbing noxious volatile impurities such as hydrogen sulphide tending to escape from the said sewage.

22. A sewage aerating process as claimed in claim 21 in which the foam is impregnated with ferric hydrate.

23. In a sewage treatment process: commingling sewage with a compound of a metal the sulphide of which is insoluble while said sewage contains volatile hydrogen sulphide impurities and aerating such commingled sewage while containing the hydrogen sulphide impurities, and thereby effecting formation of inert sulphur residues in the sewage from volatile hydrogen sulphide impurities thereof by said aeration of such sewage in the presence of said metal compound.

24. In a sewage treatment process: commingling sewage with a compound of a metal the sulphide of which is insoluble and an alkali while said sewage contains volatile hydrogen sulphide impurities and aerating such commingled sewage with finely comminuted air while containing the hydrogen sulphide impurities, and thereby effecting formation of inert sulphur residues in the sewage from volatile hydrogen sulphide impurities thereof by said aeration of such sewage in the presence of said metal compound.

25. In a sewage treatment process: aerating the sewage in the presence of nickel sulphide employed therein as a catalyst, with the maintenance of a foam upon the surface of the liquid during said aeration.

26. In a sewage treatment process: aerating the sewage in the presence of nickel sulphide employed therein as a catalyst, then effecting sedimentation of the treated effluent and returning the resultant sludge, containing the catalyst, to further sewage to be aerated.

27. In a sewage treatment process: aerating the sewage while containing soluble sulphides and in the presence of a nickel sulphide as a catalyst for direct oxidation of $H_2S$, and thereby effecting the direct production of free sulphur from the hydrogen sulphide of said sewage by catalysis.

28. In a sewage treatment process: aerating the sewage in the presence of a catalyst consisting of a compound of a metal whose sulphide is insoluble, with the maintenance of a foam upon the surface of the liquid during said aeration.

29. In a sewage treatment process: aerating the sewage in the presence of a catalyst consisting of a compound of a metal whose sulphide is insoluble, with the maintenance of a foam upon the surface of the liquid during said aeration, then effecting sedimentation of the treated sewage and returning the resultant sludge, containing the catalyst compound, to further sewage to be so aerated.

30. In a sewage treatment process: commingling sewage with a nickel compound the sulphide of which is insoluble while said sewage contains volatile hydrogen sulphide impurities and aerating such commingled sewage while containing the hydrogen sulphide impurities, and thereby effecting formation of inert sulphur residues in the sewage from volatile hydrogen sulphide impurities thereof by said aeration of such sewage in the presence of said nickel compound.

In testimony whereof I have hereunto set my hand.

FREDERICK W. SPERR, Jr.